Figure 1:
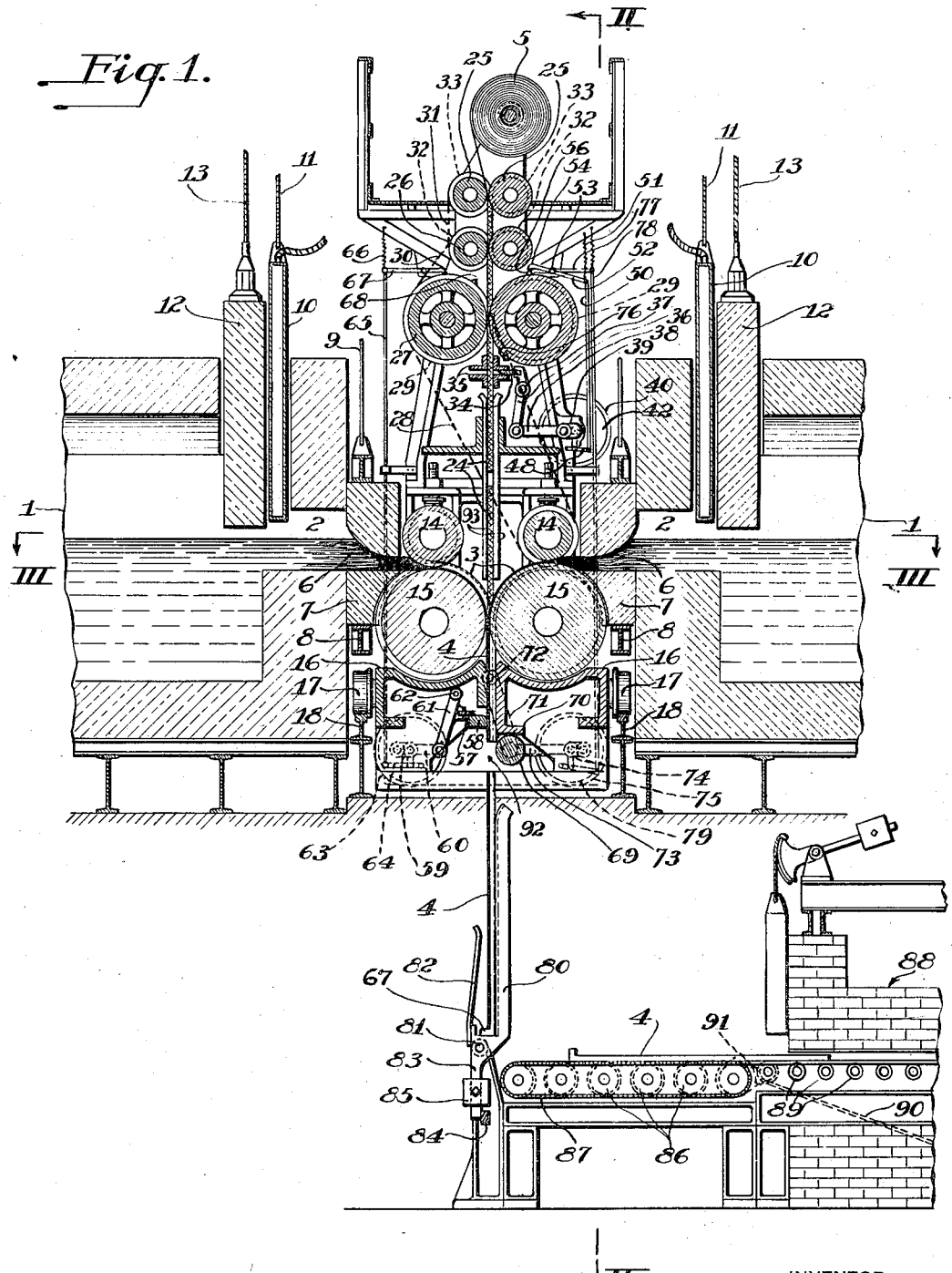

Oct. 4, 1927.

W. OWEN 1,644,349

APPARATUS FOR MAKING REENFORCED GLASS TILE

Filed March 18, 1926      4 Sheets-Sheet 1

INVENTOR
William Owen
by
James C Bradley
atty

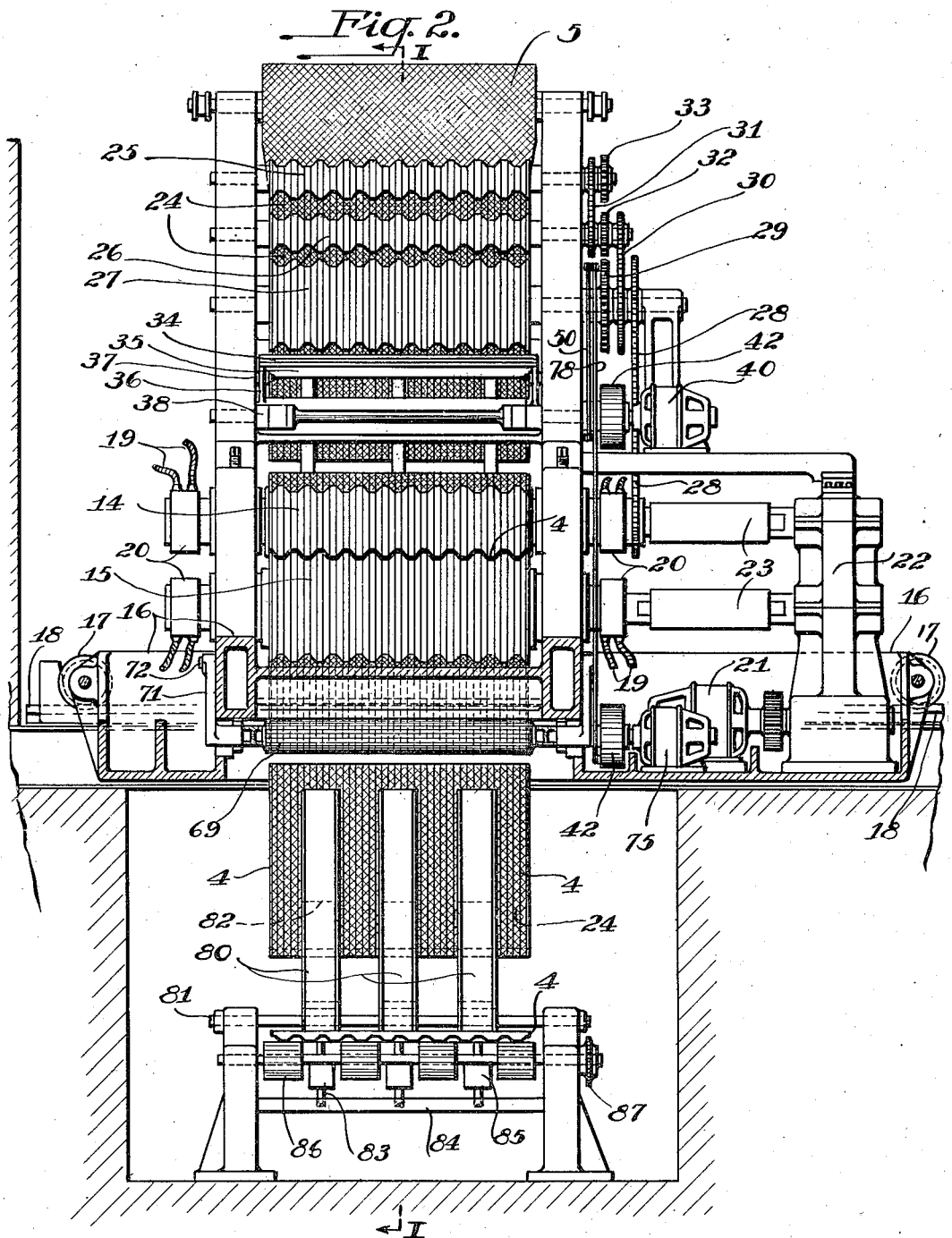

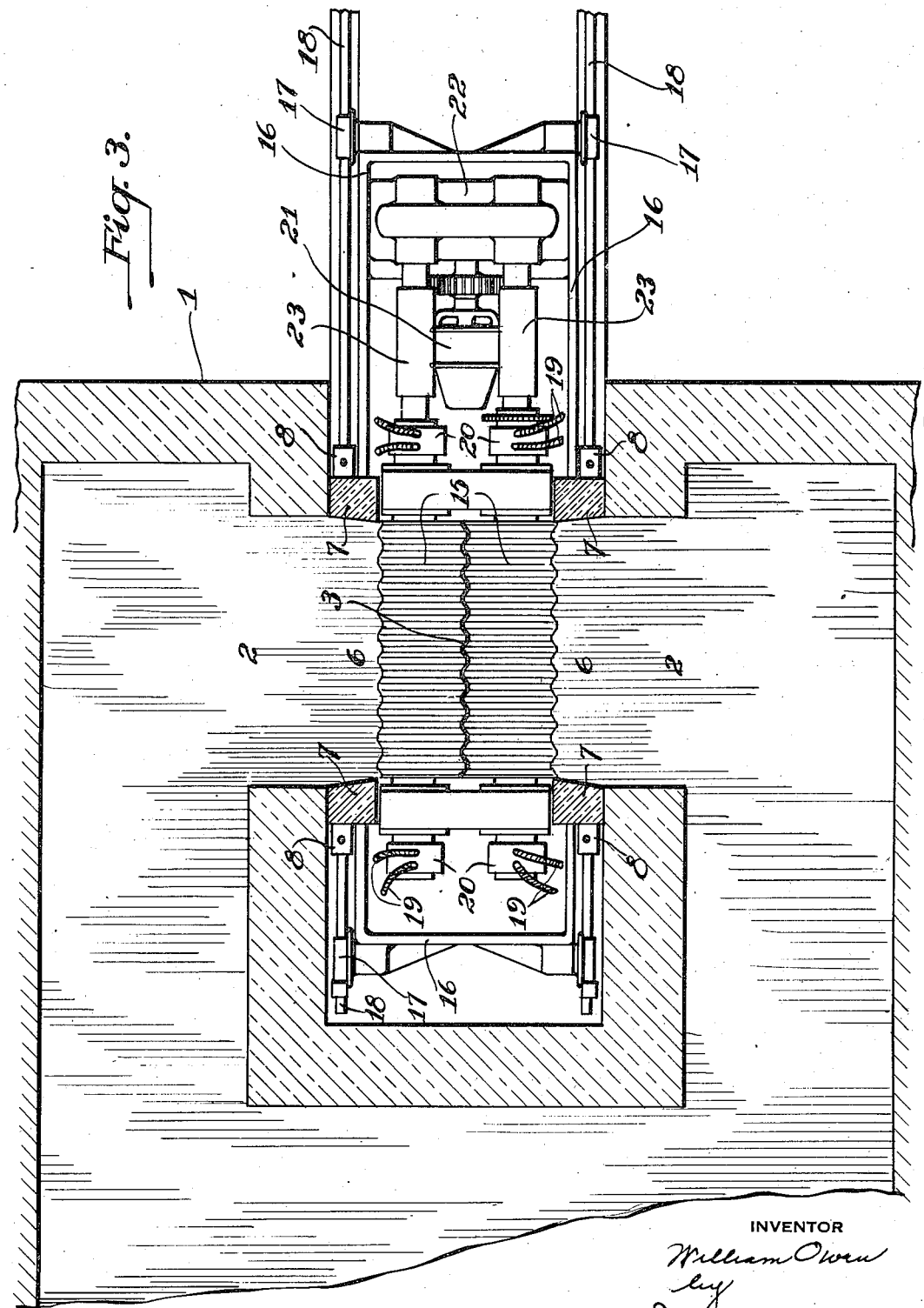

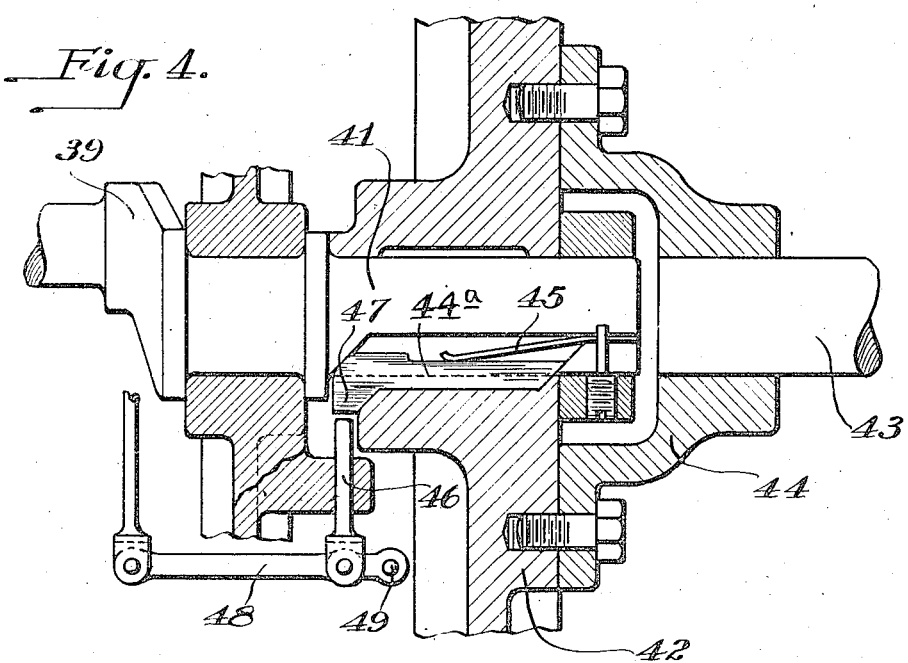
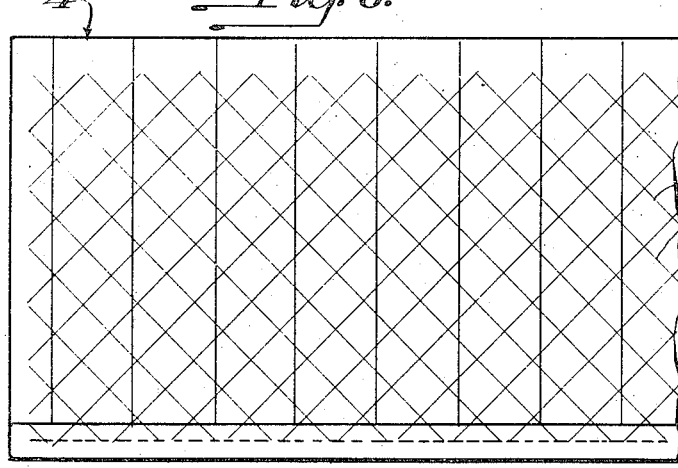
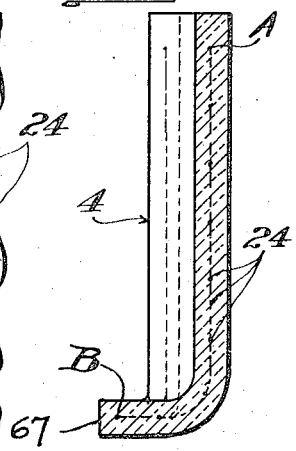

Patented Oct. 4, 1927.

1,644,349

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

APPARATUS FOR MAKING REENFORCED GLASS TILE.

Application filed March 18, 1926. Serial No. 95,690.

The invention relates to apparatus for making reenforced tile of glass for use in roofs, and involves a modification of the apparatus shown in the patent to John H. Fox, Number 1,541,635, of June 9, 1925. In this type of apparatus, two corrugated sheets or ribbons of glass are generated from opposing forehearths or receptacles and caused to meet and flow downwardly, a corrugated wire mesh being fed between the two sheets just as they meet and are welded together. The present invention has for one of its principal objects the provision of means whereby the sections of wire mesh are positioned in the glass sections with their ends short of the ends of such glass sections, so that the mesh is protected against rusting, which often occurs with wire reenforcing, beginning at the ends and working inward very considerable distances. Further objects of the invention are the provision of improved means for severing the wire mesh and the glass into sections, for shaping the ends of the glass sections thus severed and for handling the sections. One embodiment of the invention is shown in the accompanying drawings, wherein:

Figure 1 is a vertical section on the line I—I of Fig. 2. Fig. 2 is a vertical section on the line II—II of Fig. 1. Fig. 3 is a horizontal section on the line III—III of Fig. 1. Fig. 4 is a detail section on an enlarged scale through one of the clutches employed. And Figs. 5, 6 and 7 are detail views of the reenforced glass tile produced by the operation of the apparatus.

Referring to the drawings, 1 is a glass melting tank, preferably of the regenerator type, having a pair of outlets 2, 2 spaced oppositely so that the ribbons 3, 3 flowing from the outlets may be caused to approach and meet, forming the composite sheet 4, between which wire mesh from the roll 5 is directed. The slots 6, 6 through which the ribbons or sheets pass are carried in vertically adjustable wall members 7, 7, supported in frames 8, 8 and carried by the chains 9, 9. When it becomes necessary to interrupt the operation of the apparatus, the flow of glass through the outlets 2, 2 may be cut off by means of the water cooled gates 10, 10 adjustably supported from above by means of the chains 11, 11. This same result may also be accomplished by means of the refractory gates 12, 12 supported from above by means of the chains 13, 13. The ribbons or sheets of glass are sized between the pairs of water cooled rolls 14, 15 and 14, 15, such rolls being preferably carried by a truck body 16 having the wheels 17 and mounted upon the track 18, thus providing a means for removing the rolls from the space between the two outlet ends of the tank. The rolls 15, 15 also serve to press the plastic sheets 3, 3 together with the wire mesh therebetween in order to form the composite sheet 4, such composite sheet being cut off and handled below the rolls, as hereinafter described.

The rolls are preferably cooled by circulating water therethrough in the usual way, connections 19 leading into swivels 20 being provided at the ends of the rolls, as indicated in Fig. 2. The rolls are driven from the motor 21 carried by the truck frame 16 through the intermediary of suitable worm gearing in the casing 22 (Fig. 2), which gearing drives four short transverse shafts connected to the ends of the rolls by means of the four tumbler shafts 23. Since the tile, which it is to desired to produce are corrugated, as indicated in Figs. 5, 6 and 7, the rolls 14 and 15 are correspondingly corrugated, as indicated in Fig. 2, and the wire mesh reenforcing sections 24 which are fed between the ribbons 3, 3 are correspondingly corrugated before their entrance between the ribbons. The corrugating of the wire mesh from the roll 5 is accomplished by passing such mesh between the pairs of corrugated rolls 25, 25, 26, 26 and 27, 27, which are driven and have their contours formed so as to deform the reenforcing until it has corrugations of the desired shape and depth corresponding to the corrugations formed upon the glass ribbons by the rolls 14, 15. One of the rolls 27 is driven from the roll 14 by means of a chain 28, as indicated in Fig. 1, such chain passing around suitable sprockets keyed to the axles of the rolls. The other roll 27 is driven from the first roll 27 by means of the spur gears 29, 29 keyed to the axles of the two rolls. One of the rolls 26 is driven from one of the rolls 27 by means of the chain 30 passing around suitable sprockets keyed to the shafts of the two rolls. One of the rolls 25 is driven from one of the rolls 26 by means of the chain 31 passing around suitable sprockets keyed to the shafts of the rolls 25 and 26. The right hand rolls 25 and 26 (Fig. 1) are driven from the other rolls 25 and 26 by means of the spur gears 32, 32 and 33, 33 keyed to the axles of the rolls. The peripheral speed at which the rolls 27, 27 are driven corresponds to the peripheral speed of the rolls 14, 15, so that the mesh is fed ahead at a rate corresponding to the rate at which the glass ribbons are formed.

The sections of wire mesh are cut into lengths suitable for use in the glass tile which are to be made by means of the knife 34, guided for horizontal movement between the angles 35, 35 and operated by the lever 36 pivoted at 37 and connected at its lower end to the connecting rod 38. The connecting rod is pivoted at its other end to a crank 39 and this crank is operated from an electric motor 40 located at the side of the apparatus, as indicated at Fig. 2. The method of connecting and operating the crank will be seen by reference to Fig. 4 in connection with Fig. 1. The crank is carried by means of a short shaft 41 on which is loosely mounted the fly wheel 42. This fly wheel is directly connected with the shaft 43 of the motor 40 by means of the yoke 44, so that such fly wheel runs continuously. The shaft 41 may be connected to the fly wheel 42 so as to be rotated thereby by means of a sliding key 44ᵃ working in a keyway lying partly in the hub of the fly wheel and partly in the shaft and pressed outward by means of the spring 45. When in the position indicated in Fig. 4, the key locks the fly wheel and the shaft 41 together so that they rotate together. Normally, however, the key is pressed upward so that it lies entirely in the shaft 41 by means of the pin 46 engaging the end 47 of the key. The pin 46 is in turn carried by a lever arm 48 pivoted at 49 and connected at its outer end to the vertical rod 50. This vertical rod is normally held in upper position, thus holding the key 45 in inoperative position by means of the spring 51 (Fig. 1). The upper end of the rod 50 is connected to the end of the lever arm 52 pivoted at 53 and having an end 54 adapted to be operated by a suitable cam carried by the shaft of the roller 27. This cam has an operating projection 56 adapted to engage the end 54 and in this way lower the rod 50. At each revolution of the roller 27, therefore, the rod 50 is caused to move down momentarily, thus moving the pin 46 (Fig. 4) momentarily, so that the key 44 can move down to the position indicated in Fig. 4, thus locking the shaft 41 to the fly wheel 42. The crank 39 is thus rotated reciprocating the knife 34 and severing the wire mesh. The crank 39 makes only a single revolution, as the rod 50 immediately moves up after passing the cam projection 56, thus raising the pin 46 so that when the key 44 again reaches the pin, it is moved up to inoperative position by such pin.

After the composite sheet 4 passes the rolls 15, 15, it is cut off by means of the reciprocating knife 57 guided for horizontal movement upon the upper side of the member 58. This knife is operated from a crank 59 through the intermediary of the connecting rod 60 and the lever arm 61 pivoted at 62, to which the end of the knife is pivoted. The crank 59 is driven from a motor 63 in the same manner that the crank 39, heretofore described, is driven from the motor 40, and the actuation of the knife is controlled in the same manner from a lever arm 64 connected to the vertical rod 65. The rod 65 is pulled upward by means of the spring 66 and is pivoted at its upper end to a lever 67, whose end is operated by a cam projection 68 forming part of cam mounted upon the shaft of the left hand roll 27 (Fig. 1). The actuation of the cutting off apparatus as controlled by the cam 68 is the same as that heretofore described in connection with the cutting off device for the wire mesh as controlled from the cam member 56. The composite reenforced glass ribbon is thus cut into lengths suitable for use as glass tile.

The apparatus includes a means for forming a flange 67 upon the tile, as indicated in Figs. 6 and 7, and this flanging operation is performed immediately after the cutting off operation by the knife 57. At this time the extreme lower edge of the sheet projects below the member 58 a distance sufficient to provide the material for the flange to be formed, and the flanging operation is accomplished by means of a transverse moving roller 69. This roller is guided upon the lower flange of a guide member 70 and is supported in its swinging movement by a link 71 pivoted at 72. The axle of the roller is supported upon the end of a connecting rod 73, the right hand end of such connecting rod being pivoted to the crank 74. The crank 74 is operated from a motor 75 in the same manner as that described in connection with the crank 39 and motor 40, so that at suitable intervals the crank 74 is caused to make a single revolution, thus carrying the roller 69 to the left beneath the member 58 and then returning it to the position illustrated, where it remains until the proper time arrives for flanging the next tile section. The movement of the roll 69 to the left turns the lower edge of the composite sheet to the left, thus forming the flange 67 at the lower edge of the tile. The actuation of the crank 74 is controlled from a cam projection 76 carried by the axle of the right hand roll 27. This cam projection is adapted to swing the arm 77, thus lowering a rod 78 lying in line with the rod 50 (Fig.

1), and shown in Fig. 2. This downward movement of the rod lowers a pin corresponding to the pin 46 shown in Fig. 4 so that the key of the clutching device locks the fly wheel 79 to the axle of the crank 74, thus giving the crank its desired rotation and operating the roller 69.

Located below the cutting off and flanging device, just described, is a transfer device including a carrier 80 pivoted at 81 and provided with a guard 82 to prevent the glass from tilting to the left and to guide it into position. This carrier has its lower end 83 extended below the pivot 81 and adapted to engage a stop 84 when the device is in the position illustrated. The lower end of the carrier is also provided with a counterweight 85, so that when the carrier is free of the sheet of glass, it will normally swing to the upright position shown. When the carrier receives the glass sheet, however, this additional weight to the right of the pivot 81 causes the carrier to swing to a horizontal position, bringing the glass on to the series of rolls 86. The carrier 80 is made up of fingers interspersed between the rolls 86, as indicated at Fig. 2, which arrangement permits of the transfer of the glass from the carrier to the rolls. These rolls are driven continuously forward by means of a sprocket chain 87 passing around suitable sprockets at the ends of the roll shafts. The glass sheets are, therefore, fed ahead by the rolls into the leer 88, where they are received upon other rolls 89 driven from the sprocket chain 90 passing over suitable sprockets on the ends of the rolls. The chain 90 is driven in any suitable manner, and the rolls 86 are driven from the end roll of the series 89 by means of a sprocket 91 passing around the end of one of the series of rolls 86. After the glass sheet is carried by the rolls 86 into the leer, the carrier 80, thus relieved of its load, automatically returns to vertical position, and is ready to receive another sheet. The space intermediate the knife 57 and the bottom of the carrier 80 is such that after the cut off occurs, the sheet drops down about six inches, thus providing a clearance space at 92 to permit the flanging roller 69 to pass to the left and then back to its starting position without touching the upper end of the sheet which is now supported by the carrier.

As indicated in Figs. 6 and 7, the end of the wire reenforcing terminates at the points A and B, preferably about one half inch short of the end edges of the glass. The purpose in this is to have the ends of the wire mesh sealed off from contact with the atmosphere, so that there is no opportunity for the rusting action which has heretofore been more or less troublesome in reenforced glass tile, such rusting effect tending to work in a considerable distance and impair the strength of the tile. The spacing of the wire mesh 24 away from the end of the glass is accomplished by timing the operation of the knife 34 so that this knife operates to cut off the mesh section 24 before the lower end of the mesh section engages the glass where the two ribbons 3, 3 meet. Preferably this distance is about one inch, so that when the mesh section 24 drops down this distance, its upper end is spaced away from the edge of the oncoming wire mesh a corresponding distance. The knife 57 for severing the composite ribbon is timed so that it cuts the glass midway between the ends of adjacent mesh sections. This arrangement, therefore, gives about one half inch of glass intermediate the end of the mesh section and the end of the glass sheet.

In operation, the cut off gates are raised to the position shown, allowing the glass to flow between the rolls 14 and 15 forming the ribbons 3, 3, which are welded together to provide the downwardly moving sheet 4, the ribbons meeting at a temperature such that the glass is plastic and welds together without difficulty. After the sheet 4 is well started, the feeding of the wire mesh from the roll 5 is started, the parts being timed so that the mesh is fed forward at substantially the same speed as the speed of movement of the glass sheet 4. The knife 34 operating under the control of the cam projection 56 cuts off sections of mesh 24, which, as heretofore indicated, are about one inch shorter than the glass tile to be produced. These sections are cut off and drop downwardly in order to give the desired spacing between the mesh sections. The mesh section is guided in its downward movement between vertical guide bars 93 and its lower end engages the ribbons 3, 3 at their point of juncture, so that as the rolling operation proceeds, the mesh section is fed between the two ribbons and is incorporated at the center of the composite sheet 4. The knife 57 operating under the control of the cam projection 68 severs the composite sheet 4 into sections of the desired length. The flanging roller operated by the crank 74 under the control of the cam projection 76 turns the lower edge of each sheet to the left against the lower surface of the member 58 and then moves back to starting position so that the oncoming sheet may move down into the carrier 80. After the sheet is cut off, it drops down to the position illustrated in Fig. 1 and the carrier, under the influence of this additional weight lying on the right hand side of the pivot 81 moves down to horizontal position, so that the glass sheet rests upon the rolls 86 and is carried into the leer, the carrier then moving back to vertical position to receive the next sheet.

What I claim is:

1. In combination with a machine for continuously flowing two ribbons of glass, so that they converge and meet, and means for pressing the ribbons together, of means for feeding a continuous wire mesh toward the juncture of the ribbons, means for severing the wire mesh into sections before the ends of the sections reach the juncture between the ribbons and causing the sections to move forward so as to space apart the severed ends of the sections, and means for severing the reenforced glass into sections along lines intermediate the ends of the mesh sections.

2. In combination with a machine for continuously flowing two ribbons of glass, so that they converge and meet, and means for pressing the ribbons together, of means for feeding sections of wire mesh between the two ribbons with such sections spaced apart to provide transverse bands of glass free of the mesh reenforcing, and severing the continuous ribbon of glass thus formed at such transverse bands.

3. In combination with a machine for continuously flowing two ribbons of glass, so that they converge and meet, and move downwardly, and means for pressing the ribbons together, of means for feeding a wire mesh downwardly toward the juncture of the ribbons, severing means for the mesh timed so as to cut off a section of the mesh before its lower end touches the glass, so that such section drops down by gravity after the severing operation, and means for severing the reenforced glass into sections along lines intermediate the ends of the mesh sections.

4. In combination with a machine for continuously flowing two ribbons of glass, so that they converge and meet, and move downwardly, and a pair of horizontal rolls for pressing the sections together, of means for feeding a wire mesh continuously downward toward the juncture of the ribbons, severing means for the mesh above said rolls timed so as to cut off a section of mesh before its lower end engages the glass between the rolls so that such section drops down by gravity, thus spacing it away from the end of the section following, and means below the rolls for severing the composite ribbon of glass timed so as to cut the glass along lines lying between the ends of the wire mesh sections.

5. In combination with a machine for continuously flowing two ribbons of glass, so that they converge and meet, and move downwardly, and a pair of horizontal rolls for pressing the sections together of means below the rolls for severing the composite glass ribbon into sections, and means moving transversely of the ribbon below said severing means for engaging the lower edge of the glass ribbon left after the severing operation and turning it laterally to form a flange.

6. In combination with a machine for continuously flowing two ribbons of glass, so that they converge and meet, and move downwardly, and a pair of horizontal rolls for pressing the sections together, of means below the rolls for severing the composite glass ribbon into sections, a support below the severing means for holding the lower end of the ribbon against lateral movement, and means below said supporting means and moving transversely of the ribbon for engaging the extreme lower edge of the ribbon and turning it laterally beneath the supporting means to form a flange.

7. In combination with a machine for continuously flowing two ribbons of glass, so that they converge and meet, and move downwardly, and a pair of horizontal rolls for pressing the sections together, of means below the rolls for severing the composite glass ribbon into sections, a member for receiving the lower edge of the sheet thus severed, spaced a substantial distance below said lower edge at the moment of severing, so that the severed sheet moves down by gravity leaving a clearance space above its upper edge, and means moving transversely of the ribbon in said clearance space for engaging the lower edge of the ribbon left after the severing operation and turning it laterally to form a flange.

8. In combination with a machine for continuously flowing two ribbons of glass, so that they converge and meet, and move downwardly, and a pair of horizontal rolls for pressing the sections together, of means below the rolls for severing the composite glass ribbon into sections, an upright carrier for receiving the lower edge of the sheet thus severed, mounted for swinging movement about a horizontal axis so located that when the weight of the severed sheet is imposed on the carrier, it swings laterally by gravity around said axis, and a table provided with driven feed means for engaging the severed sheet and moving it away when the carrier reaches its lateral position.

9. In combination with a machine for continuously flowing two ribbons of glass, so that they converge and meet, and move downwardly, and a pair of horizontal rolls for pressing the sections together, of means below the rolls for severing the composite glass ribbon into sections, an upright carrier for receiving the lower edge of the sheet thus severed mounted for swinging movement about a horizontal axis so located that when the weight of the severed sheet is imposed on the carrier, it swings laterally by gravity around said axis, and automatic feed means for engaging the severed sheet and moving it away when the carrier reaches its lateral position, the carrier being counterbalanced so as to return automatically to upright position when relieved of the weight of the severed sheet.

10. In combination with a machine for continuously flowing two ribbons of glass, so that they converge and meet, and move downwardly, and a pair of horizontal rolls for pressing the sections together, of means below the rolls for severing the composite glass ribbon into sections, and roller means moving transversely of the ribbon below said severing means for engaging the lower edge of the glass ribbon left after the severing operation and turning it laterally to form a flange.

11. In combination with a machine for continuously flowing two ribbons of glass, so that they converge and meet, and move downwardly, and a pair of horizontal rolls for pressing the sections together, of means below the rolls for severing the composite glass ribbon into sections, and an upright carrier for receiving the lower edge of the sheet thus severed mounted for swinging movement about a horizontal axis so located that when the weight of the severed sheet is imposed on the carrier, it swings laterally by gravity around said axis, the said carrier being balanced so as to swing back to upright position by gravity when relieved of the weight of said sheet.

In testimony whereof, I have hereunto subscribed my name this 17th day of March, 1926.

WILLIAM OWEN.